(12) United States Patent
Kubota et al.

(10) Patent No.: US 7,986,128 B2
(45) Date of Patent: Jul. 26, 2011

(54) CHARGER

(75) Inventors: Atsumasa Kubota, Hikone (JP); Masaki Ikeda, Hikone (JP); Tatsuya Miwa, Maibara (JP); Naoki Shimizu, Hikone (JP); Norihiro Iwamura, Hikone (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 907 days.

(21) Appl. No.: 11/984,651

(22) Filed: Nov. 20, 2007

(65) Prior Publication Data

US 2008/0122400 A1 May 29, 2008

(30) Foreign Application Priority Data

Nov. 27, 2006 (JP) ................................. 2006-319199

(51) Int. Cl.
*H02J 7/00* (2006.01)
(52) U.S. Cl. .......................... 320/124; 320/106; 320/125
(58) Field of Classification Search .................. 320/124, 320/125, 126
See application file for complete search history.

(56) References Cited

U.S. PATENT DOCUMENTS

| | | | | |
|---|---|---|---|---|
| 4,849,682 | A | * | 7/1989 | Bauer et al. .................... 320/106 |
| 5,612,608 | A | * | 3/1997 | Ishiguro et al. .......... 340/636.12 |
| 5,691,078 | A | | 11/1997 | Kozaki et al. |
| 6,741,065 | B1 | | 5/2004 | Ishii et al. |
| 7,446,508 | B2 | | 11/2008 | Aradachi et al. |
| 2003/0062872 | A1 | * | 4/2003 | Brotto ............................ 320/106 |
| 2003/0146736 | A1 | * | 8/2003 | Kosuda et al. ................ 320/132 |
| 2005/0099161 | A1 | | 5/2005 | Sato |

FOREIGN PATENT DOCUMENTS

| | | |
|---|---|---|
| JP | 02-087937 | 3/1990 |
| JP | 05-111184 | 4/1993 |
| JP | 07-153498 | * 6/1995 |
| JP | 09-171065 | 6/1997 |
| JP | 11-252808 | 9/1999 |
| JP | 11-285159 | 10/1999 |
| JP | 2001-045673 | 2/2001 |
| JP | 2005-143240 | 6/2005 |
| JP | 2006-162402 | 6/2006 |
| JP | 2006-288150 | 10/2006 |

OTHER PUBLICATIONS

Machine translation: JP 07-153498, title: Charging Method for seconday batter, inventor: Morita. et. al., Jun. 16, 1995.*
Machine translaiton: JP 05-111184, title: secondary battery charger and chargin Method, inventor: Ito et. al., Apr. 30, 1993.*
English translation: JP2-87937A, title: charging Equipment, Inventor: Tsujino, Mar. 28, 1990.*

* cited by examiner

*Primary Examiner* — Edward Tso
*Assistant Examiner* — Samuel Berhanu
(74) *Attorney, Agent, or Firm* — Bacon & Thomas PLLC

(57) ABSTRACT

A battery charger includes an attachment portion capable of being connected to a plurality of battery packs; a connection unit for connecting one of the battery packs connected to the attachment portion to a charging path; a state detection unit for detecting a state of each of the battery packs; a remaining capacity detection unit; and a charging control unit. The remaining capacity detection unit detects a remaining capacity based on the state of the battery pack detected by the state detection unit after each of the battery pack is charged for a specified period of time. Further, the charging control unit assigns priorities to the battery packs such that one whose remaining capacity detected by the remaining capacity detection unit is closer to a fully charged state thereof has a higher priority, and controls the connection unit to charge the battery packs according to the assigned priorities.

10 Claims, 7 Drawing Sheets

| RATE OF TEMPERATURE CHANGE | REMAINING CAPACITY |
|---|---|
| ~ α | 80% OR LOWER |
| α ~ β | 90% OR LOWER |
| β ~ | 90~100 % |

| VOLTAGE VALUE | RATE OF VOLTAGE CHANGE | REMAINING CAPACITY |
|---|---|---|
| 0~A | a~b | 20% OR LOWER |
| 0~A | 0~a | 20~50% |
| A~B | 0~a | 50~80% |
| B~C | a~b | 80~90% |
| C~ | 0~b | 90~100% |

| VOLTAGE VALUE | CURRENT VALUE | REMAINING CAPACITY |
|---|---|---|
| ~A | c ~ | 50% OR LOWER |
| A~B | | 50~70% |
| B~ | | 70~80% |
| | b~c | 80~90% |
| | a~b | 90~100% |

FIG.9

| 1 | 0 | 0 | 1 | 0 | 1 | 0 | 1 | 0 | 1 | 0 | 1 | 0 | 1 | 0 | 0 |

TYPE — NUMBER OF CELLS (1~31) — REMAINING CAPACITY — RATED CAPACITY

00 : LEAD ACID BATTERY
01 : Ni-Cd BATTERY
10 : Ni-MH BATTERY
11 : Li-Ion BATTERY

0 : 0%
1 : 10%
..
10 : 100%

12 : 1200mAh
16 : 1600mAh
20 : 2000mAh
..

*FIG. 10A*
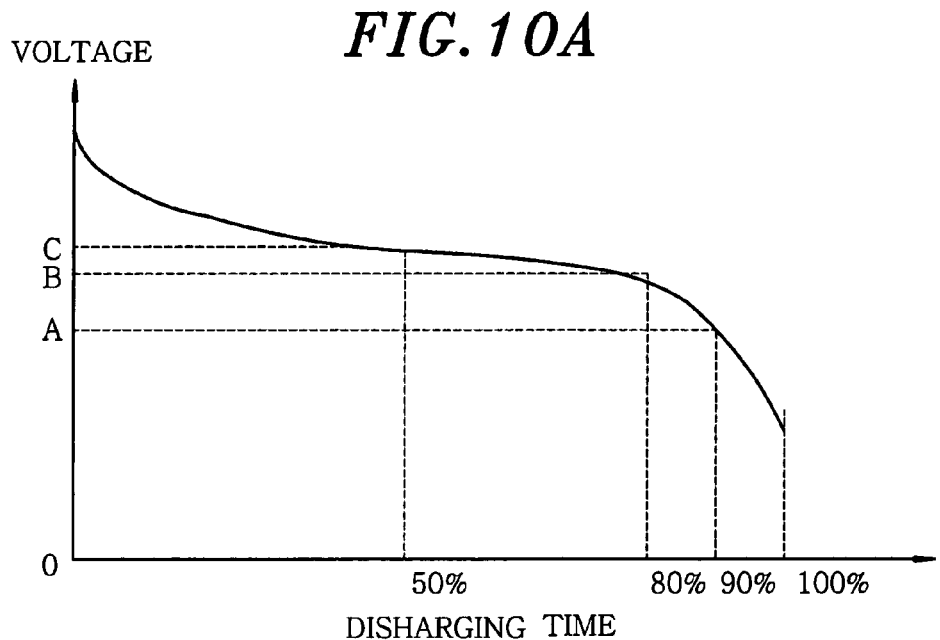
*FIG. 10B*
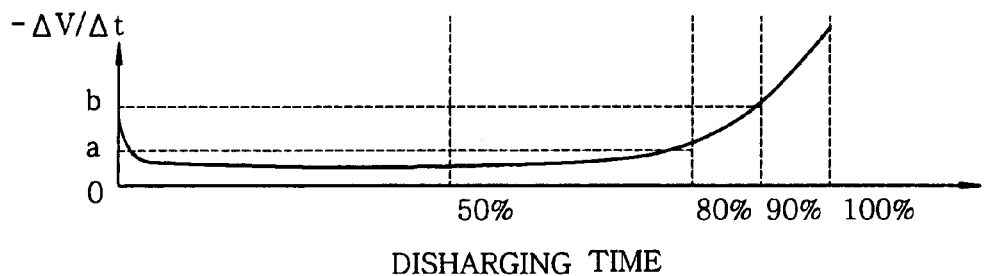
*FIG. 11*
| VOLTAGE VALUE | RATE OF VOLTAGE CHANGE | REMAINING CAPACITY |
|---|---|---|
| C~ | 0~a | 50% OR LOWER |
| B~C | | 50~80% |
| A~B | a~b | 80~90% |
| 0~A | b~ | 90~100% |

CHARGER

FIELD OF THE INVENTION

The present invention relates to a battery charger.

BACKGROUND OF THE INVENTION

Conventionally, in a battery charger equipped with a attachment part capable of connecting thereto a plurality of battery packs, a number of configurations have been adopted by considering the performance of a power supply circuit in the battery charger and the safety in case of a failure due to, e.g., a dust clogging. In accordance with such conventional configurations, a plurality of battery packs are loaded at the same time; one battery pack is loaded while another is being charged; or a plurality of battery packs are connected before a power of the battery charger is turned on. Further, when a plurality of battery packs are loaded, one of them is preferentially charged.

In accordance with an examples of the above configurations, if a battery pack is loaded after another battery pack has been loaded first and started being charged, the charging of the first loaded battery pack is continued without being interrupted by the later loaded one. Further, in accordance with another example, one of attachment ports is previously set as a priority attachment port, and, if a battery pack gets connected to the priority attachment port while other battery pack connected to other attachment port is being charged, the charging is diverted to the one connected to the priority attachment port.

However, in the above-mentioned battery charger equipped with the priority attachment port, there may be a case where the charging is diverted to the battery pack connected to the priority attachment port when other battery pack is almost fully charged. In this case, if the remaining capacity of the battery pack connected to the priority attachment port is small, it takes a long time to complete the charging of the other battery pack.

Further, if the battery pack connected to the priority attachment port enters a temperature waiting mode during being charged, the charging is stopped until the temperature of the battery pack returns to a normal temperature. Therefore, it takes an even larger amount of time for all the battery packs to be fully charged.

Further, in conventional battery chargers, there is also known a configuration in which, if a plurality of battery packs are loaded, the charging is started from a battery pack having a greater rated capacity. However, in this configuration, it requires a large amount of time to completely charge a battery pack compared to the case where the charging is started from a battery pack having a smaller rated capacity.

In this regard, Patent Document 1 discloses a method of charging battery packs as follows: reading data of full charge capacity and remaining capacity from a non-volatile memory in each of battery packs; assigning priorities to the battery packs in ascending order of difference between the full charge capacity and the remaining capacity; and charging the battery packs according to the priority. (Patent Document 1) Japanese Patent Application Publication No. 11-285159

However, in the method of the above patent document, there is a drawback in that the priorities are determined based on the remaining capacity data stored in the non-volatile memory in the battery pack. That is, it cannot be guaranteed that the remaining capacity data stored in the non-volatile memory indicates exactly the actual remaining capacity of the battery pack, especially if a long period of time has elapsed since the use of the battery pack. Therefore, it is difficult to assign the priorities to the battery packs exactly in descending order of closeness to the fully charged states.

SUMMARY OF THE INVENTION

In view of the foregoing, the present invention provides a battery charger capable of detecting the remaining capacity of each battery pack with a high precision when a plurality of battery packs is to be charged, thereby allowing the user to obtain a fully charged battery pack more promptly.

In accordance with one aspect of the present invention, there is provided a battery charger, including an attachment portion capable of being connected to a plurality of battery packs; a connection unit for connecting one of the battery packs connected to the attachment portion to a charging path; a state detection unit for detecting a state of each of the battery packs; a remaining capacity detection unit for detecting a remaining capacity of each of the battery packs connected to the attachment portion based on the state of the battery pack detected by the state detection unit after each of the battery pack is charged for a specified period of time; and a charging control unit for assigning priorities to the battery packs such that one of the battery packs whose remaining capacity detected by the remaining capacity detection unit is closer to a fully charged state thereof has a higher priority, and controlling the connection unit to charge the battery packs according to the assigned priorities.

In accordance with this configuration, after each battery pack connected to the attachment portion has been charged for a specified period of time, the state of each battery pack is detected. Then, the remaining capacity of each battery pack is detected on the basis of the detected state of each battery pack, and the priorities are assigned to the battery packs in descending order of closeness to the fully charged state. Finally, the respective battery packs are charged according to the assigned priorities. Thus, since the state of each battery pack is detected after the battery pack has been charged for a specified period of time to be stabilized in its state, and the remaining capacity of each battery pack is detected on the basis of the detected state, the remaining capacity of the battery pack can be exactly detected. Further, since the priorities are assigned to the battery packs in decreasing order of closeness to the fully charged state based on the remaining capacity detected in this way, the reliability of priorities can be improved, and thus the user can obtain a fully charged battery pack more promptly.

It is preferable that the battery charger further includes a battery type detection unit for determining a pack type specified by at least one of a type of each of the battery packs connected to the attachment portion, the number of cells in said each of the battery packs, and a rated capacity of said each of the battery packs; and a table storage unit for storing therein tables predefined according to the pack type to indicate a relationship between the state of each of the battery packs and the remaining capacity, wherein the remaining capacity detection unit elects a table from the tables stored in the table storage unit based on the pack type determined by the battery type detection unit, and detects the remaining capacity of each of the battery packs by referring to the elected table.

In accordance with this configuration, the remaining capacity of each battery pack is detected with reference to a table indicating the relationship between the state of the battery pack and the remaining capacity according to the pack type that is specified by at least one of a type of battery pack, the number of cells and the rated capacity. Thus, the remaining capacity can be detected with a higher precision.

Further, it is also preferable that the state detection unit detects a temperature of each of the battery packs as the state of the battery pack, the table indicates a relationship between a rate of temperature change in each of the battery packs and the remaining capacity during a charging, and the remaining capacity detection unit calculates the rate of temperature change based on the temperature detected by the state detection unit to thereby specify the remaining capacity based on the calculated rate of temperature change by referring to the table.

In accordance with this configuration, the temperature of each battery pack is detected as the state of the battery pack, and the rate of temperature change in each battery pack is obtained from the detected temperature to detect the remaining capacity of the battery pack. Accordingly, the remaining capacity can be detected with a higher precision.

Further, it is also preferable that the state detection unit detects a voltage of each of the battery packs as the state of the battery pack, the table indicates a relationship between a voltage or a rate of voltage change in each of the battery packs and the remaining capacity of each of the battery pack during a charging, and the remaining capacity detection unit specifies the remaining capacity based on the voltage detected by the state detection unit or the rate of voltage change obtained from the voltage by referring to the table.

In accordance with this configuration, the voltage of each battery pack is detected as the state of the battery pack, and the remaining capacity of the battery pack is detected on the basis of the detected voltage or the rate of voltage change obtained from the detected voltage. Thus, the remaining capacity can be detected with a higher precision.

Further, it is also preferable that the state detection unit detects a voltage of each of the battery packs and a current flowing through the charging path as the state of the battery pack, and, if the pack type determined by the battery type detection unit is a specific type, the charging control unit charges the battery pack at a constant current until the voltage of the battery pack reaches a specified value, and then at a constant voltage after the voltage of the battery pack exceeds the specified value, and wherein the table indicates relationships between the voltage, the current and the remaining capacity in case of charging the battery pack of the specific type initially at the constant current and then at the constant voltage, and the remaining capacity detection unit specifies the remaining capacity based on the voltage and the current detected by the state detection unit by referring to the table.

In accordance with this configuration, in the case of charging a battery pack at a constant current until the voltage of the battery pack reaches a specified value and at a constant voltage after the voltage exceeds the specified value, the remaining capacity of the battery pack is detected with reference to a table indicating the relationship between the voltage, the current and the remaining capacity when the battery pack is charged at either a constant current or a constant voltage. Thus, the remaining capacity can be detected with a higher precision.

In accordance with another aspect of the present invention, there is provided a battery charger, including an attachment portion capable of being connected to a plurality of battery packs; a connection unit for connecting one of the battery packs connected to the attachment portion to a charging path; a state detection unit for detecting a state of each of the battery packs; a remaining capacity detection unit for detecting a remaining capacity of each of the battery packs connected to the attachment portion based on the state of the battery pack detected by the state detection unit after each of the battery pack is discharged for a specified period of time; and a charging control unit for assigning priorities to the battery packs such that one of the battery packs whose remaining capacity detected by the remaining capacity detection unit is closer to a fully charged state thereof has a higher priority, and controlling the connection unit to charge the battery packs according to the assigned priorities.

In accordance with this configuration, the state of the battery packs is detected after each of the battery packs connected to the attachment portion has been discharged for a specified period of time, and the remaining capacity of the battery pack is detected on the basis of the detected state of the battery pack. Then, the priorities are assigned to the battery packs in descending order of closeness to the fully charged state, and the respective battery packs are charged according to the assigned priorities. That is, since the state of each battery pack is detected after the battery pack has been discharged for a specified period of time to be stabilized in its state, and the remaining capacity of the battery pack is detected on the basis of the detected state, the remaining capacity can be exactly detected. Further, the priorities are assigned to the battery packs in decreasing order of closeness to the fully charged state on the basis of the remaining capacity detected in this way. Thus, the reliability of priorities can be improved, and thus the user can obtain a fully charged battery pack more promptly.

It is preferable that the battery charger further includes a battery type detection unit for determining a pack type specified by at least one of a type of each of the battery packs connected to the attachment portion, the number of cells in said each of the battery packs, and a rated capacity of said each of the battery packs; and a table storage unit for storing therein tables predefined according to the pack type to indicate a relationship between the state of each of the battery packs and the remaining capacity, wherein the remaining capacity detection unit elects a table from the tables stored in the table storage unit based on the pack type determined by the battery type detection unit, and detects the remaining capacity of each of the battery packs by referring to the elected table.

In accordance with this configuration, the remaining capacity of each battery pack is detected with reference to a table indicating the relationship between the state of the battery pack and the remaining capacity according to the pack type that is specified by at least one of the type of battery pack, the number of cells, and the rated capacity. Thus, the remaining capacity can be detected with a higher precision.

Further, it is also preferable that the state detection unit detects a voltage of each of the battery packs as the state of the battery pack, the table indicates a relationship between a voltage or a rate of voltage change in each of the battery packs and the remaining capacity of each of the battery pack during a discharging, and the remaining capacity detection unit specifies the remaining capacity based on the voltage detected by the state detection unit or the rate of voltage change obtained from the voltage by referring to the table.

In accordance with this configuration, the voltage of each battery pack is detected as the state of the battery pack, and the remaining capacity of the battery pack is detected on the basis of the detected voltage or the rate of voltage change obtained from the detected voltage. Thus, the remaining capacity can be detected with a higher precision.

Further, it is also preferable that the battery charger further includes a communications unit for receiving pack type data from the battery pack, the pack type data indicating a pack type of each of the battery packs specified by at least one of a type of each of the battery packs connected to the attachment portion, the number of cells in said each of the battery pack, and a rated capacity of said each of the battery pack, wherein the battery type detection unit determines the pack type of each of the battery packs based on the pack type data received via the communications unit.

In accordance with this configuration, the pack type data that indicates the pack type specified by at least one of the type of each battery pack, the number of cells and the rated capacity is received from the battery pack to determine the pack type. Thus, the pack type of each battery pack can be determined more properly.

Further, it is also preferable that, if the remaining capacity detection unit determines that every one of the battery packs connected to the attachment portion are in an empty state, the charging control unit detects a rated capacity of each of the battery packs, and charges the battery packs such that one having a lower rated capacity is charged first.

In accordance with this configuration, when every one of the battery packs connected to the attachment portion is in an uncharged state, a battery pack having a lower rated capacity is charged first. Thus, the user can obtain a fully charged battery pack more promptly.

Further, it is also preferable that the state detection unit detects a temperature of each of the battery packs, and, if there is a battery pack whose temperature detected by the state detection unit is higher than a first preset value or lower than a second preset value lower than the first preset value, the charging control unit suspends a charging of the battery pack, and first charges other battery pack whose temperature detected by the state detection unit falls within a range between the first and the second preset value.

In accordance with this configuration, when there is a battery pack whose temperature is higher than a first preset value or is lower than a second preset value lower than the first preset value (that is, when there is a battery pack having an excessively high or low temperature), the charging of this battery pack is suspended. Thus, the charging of a battery pack at an excessively high or low temperature is avoided to prevent the performance of the battery packs from being deteriorated.

In accordance with the present invention, the user can obtain a fully charged battery pack more promptly.

BRIEF DESCRIPTION OF THE DRAWINGS

The above features of the present invention will become apparent from the following description of embodiment given in conjunction with the accompanying drawings, in which:

FIG. 9 is a diagram showing an exemplary format of pack type data transmitted from a battery pack;

FIG. 10A is a graph showing a voltage depending on a discharging time of the battery pack in case of constant current discharging;

FIG. 10B is a graph showing a rate of voltage change and a discharging time of the battery pack in case of constant current discharging; and FIG. 11 is a table showing the relationship between a voltage, a rate of voltage change and a remaining capacity.

DETAILED DESCRIPTION OF THE EMBODIMENTS

Figure 1:
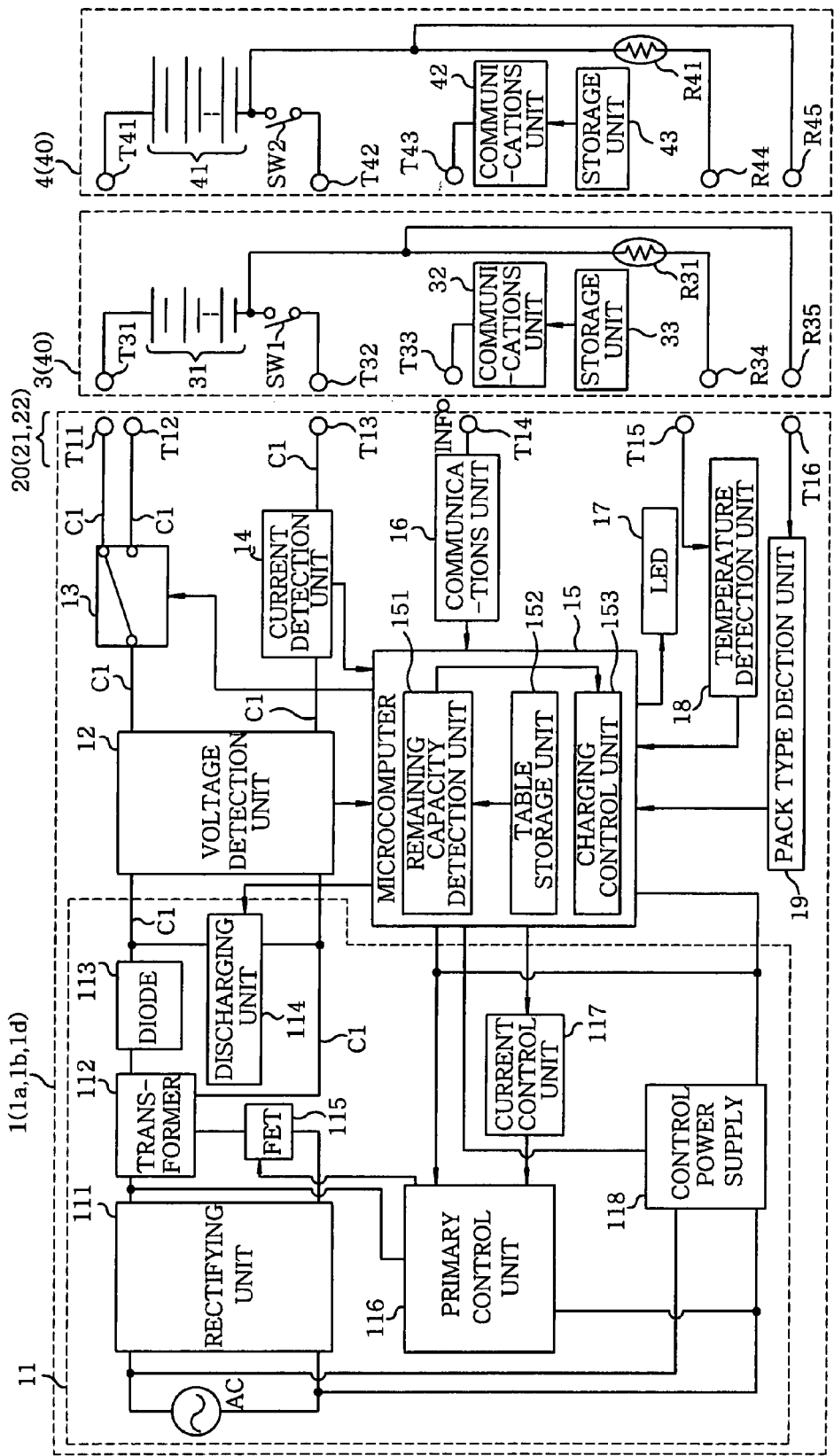
FIG. 1 is a block diagram showing the overall configuration of a battery charger in accordance with a first embodiment of the present invention.

Hereinafter, embodiments of the present invention will be described in detail with reference to the accompanying drawings. The same reference characters are used throughout the drawings to designate the same parts.

Embodiment 1

FIG. 1 is a block diagram showing the overall configuration of a battery charger 1 in accordance with a first embodiment of the present invention. For convenience of description, the battery charger 1 is assumed to be one to which two battery packs 3 and 4 can be attached. Further, in this embodiment, reference character 40 is used to designate the battery pack in general.

The battery charger 1 includes a power supply 11; a voltage detection unit 12 (state detection unit); a relay 13 (connection unit); a current detection unit 14 (state detection unit); a microcomputer 15; a communications unit 16 (communications unit); a light emitting diode (LED) 17; a temperature detection unit 18 (state detection unit); a pack type detection unit 19 (battery type detection unit); and an attachment portion 20.

The power supply 11 includes a rectifying unit 111; a transformer 112; a diode 113; a discharging unit; a field effect transistor (FET) 115; a primary control unit 116; a current control unit 117; and a control power supply 118.

The rectifying unit 111 rectifies and smoothes AC voltage, and outputs the resulting voltage to the transformer 112. The transformer 112 boosts or drops the voltage output from the rectifying unit 111 to a voltage level suitable for charging the battery pack 40. The diode 113 has an anode connected to the transformer 112 and a cathode connected to the voltage detection unit 12, and prevents a current from flowing from the voltage detection unit 12 into the transformer 112. The discharging unit 114 includes series-connected resistors and a switch turned on and off under the control of the microcomputer 15, and is used to discharge the battery pack 40 for a specified period of time.

The FET 115 has a gate connected to the primary control unit 116, a drain connected to the transformer 112, and a source connected to the rectifying unit 111, and is turned on and off in response to a PWM signal output from the primary control unit 116 so as to electrically connect and disconnect the rectifying unit 111 to and from the transformer 112.

The primary control unit 116 generates the PWM signal in response to a signal corresponding to "increase duty ratio" or "decrease duty ratio", which is output from the current control unit 117 that will be described later, and outputs the PWM signal to the FET 115. Further, the primary control unit 116 turns off the FET 115 when receiving a signal corresponding to "stop charging" that will be described later from the microcomputer 15.

When receiving a signal corresponding to "decrease current" that will be described later from the microcomputer 15, the current control unit 117 outputs to the primary control unit 116 a signal corresponding to "decrease duty ratio" for decreasing the duty ratio of the current PWM signal by a preset value. Further, when receiving a signal corresponding to "increase current" that will be described later from the microcomputer 15, the current control unit 117 outputs a signal corresponding to "increase duty ratio" for increasing the duty ratio of the current PWM signal by a preset value to the primary control unit 116.

The control power supply 118 is implemented by using a power circuit, and is configured to generate a DC voltage having a specified level from an AC voltage, and output the DC voltage to the microcomputer 15.

The voltage detection unit 12 is implemented by using, for example, an analog/digital (A/D) converter, and is configured to detect a voltage between the terminals T31 and T32 of the battery pack 3 and a voltage between the terminals T41 and T42 of the battery pack 4 to thereby output the detected voltages to the microcomputer 15.

The relay 13 connects either one of the battery packs 3 and 4 to a charging path C1 under the control of the microcomputer 15. More specifically, the relay 13 electrically connects the battery pack 3 to the charging path C1 by electrically coupling the charging path C1 to a terminal T11, and electrically connects the charging path C1 to the battery pack 4 by electrically coupling the charging path C1 to a terminal T12.

Among the paths indicated by bold line segments in FIG. 1, the charging path C1 refers to a path connecting between the terminal T11 or T12 and the relay 13, between the relay 13 and the voltage detection unit 12, between the voltage detection unit 12 and the diode 113, between the transformer 112 and the diode 113, between the transformer 112 and the voltage detection unit 12, between the voltage detection unit 12 and the current detection unit 14, and between the current detection unit 14 and a terminal T13. The current detection unit 14 detects a current flowing along the charging path C1, and outputs a voltage corresponding to the level of the detected current to the microcomputer 15.

The microcomputer 15 includes a central processing unit (CPU), read only memory (ROM), random access memory (RAM) and the like, and includes as functions thereof a remaining capacity detection unit 151, a table storage unit 152, and a charging control unit 153. These functions are achieved by the CPU, which executes programs stored in the ROM.

The remaining capacity detection unit 151 calculates a rate of temperature change in each of the battery packs 3 and 4 connected to the attachment portion 20 after the battery packs 3 and 4 have been individually charged for a specified period of time, and determines the remaining capacity of each of the battery packs 3 and 4 on the basis of the calculated rate of temperature change.

More specifically, the remaining capacity detection unit 151 specifies a table among those stored in the table storage unit 152 according to the pack type of each of the battery packs 3 and 4 detected by the pack type detection unit 19. Thus, the tables for the battery packs 3 and 4 are respectively specified. Further, the remaining capacity detection unit 151 charges each of the battery packs 3 and 4 for a specified period of time, and then calculates the rate of temperature change in each of the battery packs 3 and 4 based on a plurality of temperatures measured by the temperature detection unit 18 during a short time period immediately after the specified period of time has elapsed. Further, the remaining capacity detection unit 151 determines the remaining capacity corresponding to the calculated rate of temperature change from the above-specified table. Thus, the remaining capacities of the battery packs 3 and 4 are determined.

Herein, the pack type is specified by at least one of the following: a type of the battery pack 40, the number of cells in the battery pack 40 and the rated capacity of the battery pack 40. The type of battery pack 40 refers to the type of secondary battery, such as a nickel-cadmium (Ni—Cd) battery, a nickel-manganese (Ni—MH) battery, a lithium-ion (Li—ION) battery or a lead acid battery. The number of cells in the battery pack 40 refers to the number of battery cells constituting the battery pack 40. The rated capacity of the battery pack 40 indicates the amount of electric energy that can be stored in the battery pack 40. Further, in this embodiment, the pack type includes a first pack type and a second pack type, wherein the battery pack 3 is of the first pack type, and the battery pack 4 is of the second pack type.

Further, the specified period of time may be defined as a time period from the timing at which the charging of the battery pack 40 is initiated to the timing at which the state of the battery pack 40 is stabilized. For example, the specified period of time is 30 seconds or 1 minute, and preferably 2 minutes in case of a small charging current.

The table storage unit 152 stores therein a plurality of tables predefined according to the pack type. Herein, the table indicates the relationship between the rate of temperature change and the remaining capacity of each battery pack during the charging.

Figure 2A:
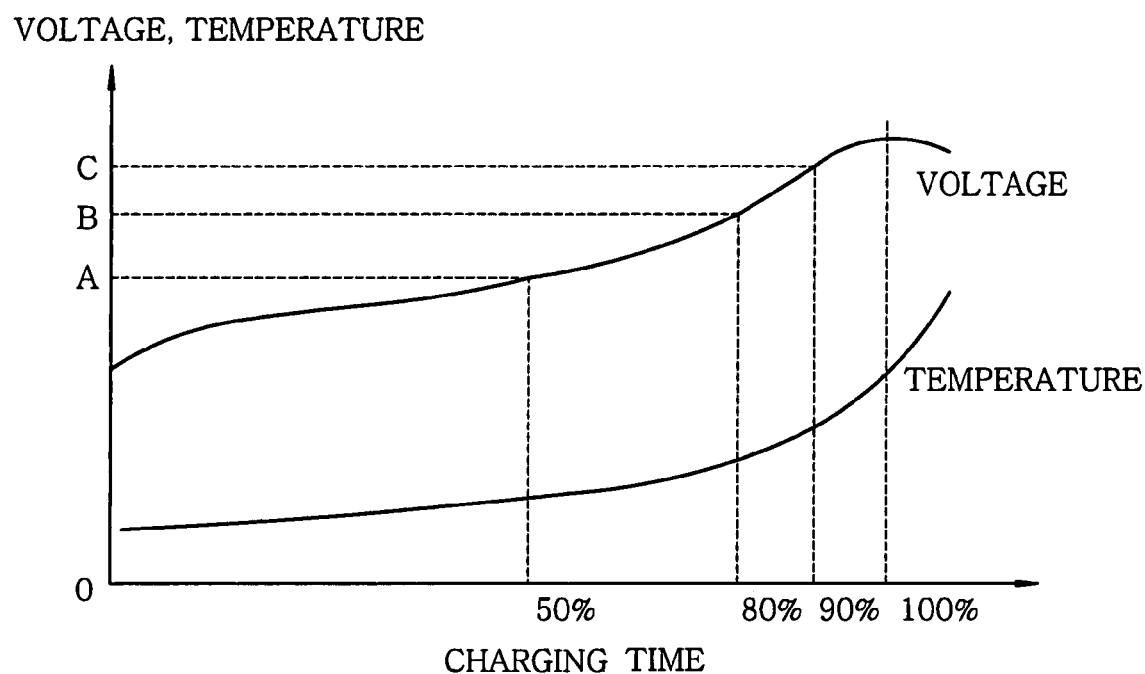
FIG. 2A is a graph showing a voltage and a temperature depending on a charging time of the battery pack in case of constant current charging.

FIG. 2A is a graph showing the voltage and the temperature depending on the charging time of the battery pack 40 in case of constant current charging, wherein the vertical axis indicates the voltage and the temperature, and the horizontal axis indicates the charging time. Herein, the charging time is represented by the ratio of the present charging time to the total charging time required for fully charging an empty battery pack 40. As shown therein, it can be understood that both the voltage and the temperature increase as the charging continues, and the slopes of the temperature and the voltage become steep when the battery pack 40 is close to a fully charged state.

Figure 2B:
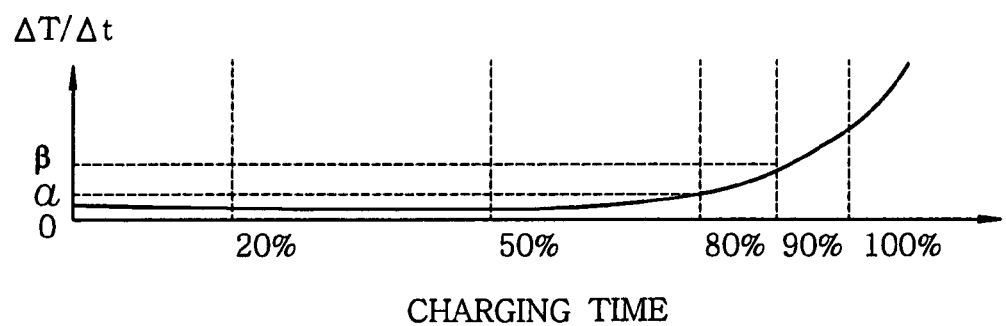
FIG. 2B is a graph showing a rate of temperature change depending on a charging time of the battery pack in case of constant current charging.

FIG. 2B is a graph showing the rate of temperature change ΔT/Δt depending on the charging time of the battery pack in case of constant current charging, wherein the vertical axis indicates rate of temperature change, and the horizontal axis indicates the charging time. As shown therein, the rate of temperature change varies so slowly that it is nearly constant until the charging time reaches 75%. However, the rate of temperature change increases with a slightly steep slope right after the charging time exceeds 75%, further increases with a steeper slope while the charging time changes from 80% to 90%, and increases even more with a much steeper slope after the charging time exceeds 90%. Further, the graph of the rate of temperature change depending on the charging time varies in shape according to the type of the battery pack 40, the surrounding temperature, and the level of charging current. However, the characteristic that both the voltage and the temperature suddenly increase near a fully charged state is preserved regardless of changes in the above factors.

Figures 3, 4, 5:
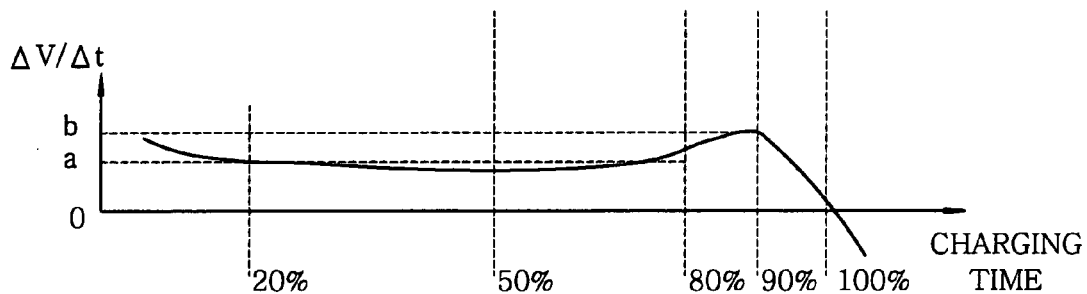
FIG. 3 is a table showing the relationship between a rate of temperature change and a remaining capacity.
FIG. 4 is a graph showing the relationship between a rate of voltage change and a charging time of the battery pack in case of constant current charging.
FIG. 5 is a table showing the relationship between a voltage, a rate of voltage change and a remaining capacity.

FIG. 3 shows an exemplary table stored in the table storage unit 152. This table, which shows the relationship between the rate of temperature change and the remaining capacity, is created based on the experimental results as shown in FIG. 2B that were obtained by actually charging the battery pack 40 at a constant current. The table storage unit 152 stores the table of FIG. 3, which has been created in advance for each pack type. With reference to this table, the remaining capacity detection unit 151 determines the remaining capacity of the battery pack 40 as follows: the remaining capacity is equal to or less than 80% if the calculated rate of temperature change is equal to or less than α; the remaining capacity is greater than 80% and is equal to or less than 90% if the calculated rate of temperature change is greater than α and is equal to or less than β; and the remaining capacity of the battery pack 40 is greater than 90% and is equal to or less than 100% if the calculated rate of temperature change is greater than β.

The charging control unit 153 performs charging control for the battery pack 40. In case of the constant current charging, the charging control unit 153 transmits to the current control unit 117 a signal corresponding to "decrease current" when the current value detected during a sampling period by the current detection unit 14 is greater than a target current value, and a signal corresponding to "increase current" when the current value is less than the target current value. In case of the constant voltage charging, the charging control unit 153 transmits a signal corresponding to "decrease current" to the current control unit 117 when the voltage value detected during a sampling period by the voltage detection unit 12 exceeds a target voltage value; and, depending on the type of battery pack 40, the charging control unit 153 may transmit a signal corresponding to "increase current" to the current control unit 117 when the voltage value detected by the voltage detection unit 12 is less than the target constant voltage value.

Further, when the current value detected by the current detection unit 14, the voltage value detected by the voltage detection unit 12 or the temperature detected by the temperature detection unit 18 exceeds a specified value, and thus an abnormality is detected in the state of the battery pack 40, the charging control unit 153 outputs a signal, corresponding to "stop charging" for stopping the charging of the battery pack 40, to the primary control unit 116.

Further, the charging control unit 153 assigns priorities as follows: among the battery packs 3 and 4, a higher priority is assigned to the one whose remaining capacity detected by the remaining capacity detection unit 151 is closer to the fully charged state. Then, the charging control unit 153 controls the relay 13 such that the battery pack 40 (i.e., the battery packs 3 and 4) are charged according to the assigned priorities.

Thus, among a plurality of battery packs that have been connected at the same time, the one closer to the fully charged state is first charged. In this manner, the user can obtain a fully charged battery pack more promptly than a case where a battery pack closer to an empty state is first charged.

Further, if it is determined by the remaining capacity detection unit 151 that the remaining capacities of both the battery packs 3 and 4 connected to the attachment portion 20 are empty, the charging control unit 153 detects the rated capacities of the battery packs 3 and 4, and charges the battery packs 3 and 4 such that the one having a lower rated capacity is charged first.

Herein, it would be preferable that, when the communications units 32 and 42 of the battery packs 3 and 4 transmit data that indicates the rated capacities of the battery packs 3 and 4, the charging control unit 153 detects the rated capacities of the battery packs 3 and 4 based on the data. Alternatively, the charging control unit 153 may detect the rated capacities of the battery packs 3 and 4 based on the voltage values detected by the voltage detection unit 12 or the current values detected by the current detection unit 14.

Further, if either one of the battery packs 3 and 4 has a temperature higher than a first preset value or lower than a second preset value (which is lower than the first preset value), the charging control unit 153 suspends the charging of the one having such temperature, and first charges the other one whose temperature falls within a range between the first and second preset value.

If the battery pack 40 has a communications function, the communications unit 16 transmits or receives various types of data to or from the battery pack 40.

The LED 17 is turned on under the control of the microcomputer 15 when the temperature of the battery pack 40 detected by the temperature detection unit 18 exceeds a specified temperature, thus indicating the charged state of the battery pack 40.

The temperature detection unit 18, implemented by using, for example, an A/D converter, converts a voltage between both terminals of each of thermistors R31 and R41 which indicates the temperatures of the battery pack 3 or 4 into a digital signal, and outputs thus obtained digital signal to the microcomputer 15.

The attachment portion 20 includes two attachment parts 21 and 22 for being connected to the battery packs 3 and 4, respectively. The attachment part 21 includes terminals T11, T13, T14, T15, and T16, and the attachment part 22 includes terminals T12, T13, T14, T15, and T16.

The terminals T11 or T12 is connected to an anode electrode of the battery pack 3 or that of the battery pack 4, respectively, and the terminal T13 is connected to a cathode electrode of the battery pack 3 or that of the battery pack 4. The terminal T14 is a communications terminal connected to a terminal T33 of the battery pack 3 or a terminal T43 of the battery pack 4, and receives data transmitted from the battery pack 3 or 4. The terminal T15 is a temperature terminal connected to a terminal T34 of the battery pack 3 or a terminal T44 of the battery pack 4, and receives a voltage between both terminals of the thermistor R31 or R41.

The terminal T16 is a terminal connected to a terminal T35 of the battery pack 3 or a terminal T45 of the battery pack 4, and receives an electrical signal for determining the pack type of the battery pack 40.

The pack type detection unit 19 determines that the attachment part 21 or 22 is connected to the battery pack 40 of the second pack type (i.e., the battery pack 4) if an anode electrode voltage (i.e., a ground voltage) is being applied thereto; and that the attachment part 21 or 22 is connected to the battery pack 40 of the first pack type (i.e., the battery pack 3) if the terminal T16 thereof is being open.

The battery pack 3 includes a battery cell unit 31; a thermo switch SW1; a communications unit 32; a storage unit 33; a thermistor R31; and terminals T31 to T35. The battery cell unit 31 includes one or more battery cells connected in series. The thermo switch SW1 is implemented by, e.g., a bimetal switch, and is turned off to stop the charging of the battery pack 3 when the temperature of the battery pack 3 exceeds a specified temperature that might cause a danger to the user.

The communications unit 32, which is implemented by, e.g., a microcomputer including a CPU, ROM, RAM and the like, receives and transmits data from and to the battery charger 1. The storage unit 33 stores therein pack type data indicating the pack type of the battery pack 3. The thermistor R31 generates a voltage having a level corresponding to the temperature of the battery pack 3, and outputs thus generated voltage to the terminal T34. The terminal T35 is a dummy terminal that does not transmit an electrical signal, and renders the terminal T16 open so that the pack type detection unit 19 can detect the pack type of the battery pack 3 (i.e., the first pack type).

The battery pack 4 includes a battery cell unit 41; a thermo switch SW2; a communications unit 42; a storage unit 43; a thermistor R41; and terminals T41 to T45. The terminal T45 is a terminal for outputting an electrical signal indicating the pack type the battery pack 4, and outputs a voltage of the terminal T32 (i.e., the ground voltage) to the terminal T16 so that the pack type detection unit 19 can detect the pack type of the battery pack 4 (i.e., the second pack type). The remaining parts of the battery pack 4 are the same as those of the battery pack 3, and therefore, detailed descriptions thereof will be omitted.

Hereinafter, the charging operation performed by the battery charger 1 will be described. First, when the battery pack 4 is connected to the attachment part 22 concurrently with the battery pack 3 being connected to the attachment part 21, the pack type detection unit 19 determines that the battery pack 3 of the first pack type is connected to the attachment part 21, and the battery pack 4 of the second pack type is connected to the attachment part 22 on the ground that the terminal T16 of the attachment part 21 is open whereas the ground voltage is applied to that of the attachment part 22.

Next, the remaining capacity detection unit 151 connects the battery pack 3 to the charging path C1 by controlling the relay 13, thereby charging the battery pack 3 for a specified period of time. Then, during a short time period immediately after the specified period of time has elapsed, the remaining capacity detection unit 151 has the temperature detection unit 18 detect the temperature of the battery pack 3 at least two times, and then terminates the charging of the battery pack 3. Thereafter, the remaining capacity detection unit 151 calculates the rate of temperature change in the battery pack 3 from the temperatures measured during the short time period.

Next, the remaining capacity detection unit 151 elects a table for the first pack type from the table storage unit 152, and looks up the remaining capacity corresponding to the calculated rate of temperature change from the specified table to thereby detect the remaining capacity of the battery pack 3.

Next, the remaining capacity detection unit 151 connects the battery pack 4 to the charging path C1 by controlling the relay 13, and detects the remaining capacity of the battery pack 4 using the same method as that for the battery pack 3.

Next, the charging control unit 153 determines which one of the battery packs 3 and 4 is closer to the fully charged state, and sets the priority of the one closer to the fully charged state as "1" and the other as "2". Then, the charging control unit 153 connects the battery pack 40 having the priority "1" to the charging path C1 by controlling the relay 13 to charge it until fully charged. Thereafter, the charging control unit 153 connects the battery pack 40 having the priority "2" to the charging path C1 by controlling the relay 13 to charge it until fully charged, and then terminates the charging.

Further, if (a) the priority of the battery pack 3 has originally been set as "1", (b) the temperature of the battery pack 3 is higher than the first preset value or lower than the second preset value, (c) the temperature of the battery pack 4 falls within the range between the first and second preset values, and (d) the charging of the battery pack 3 may possibly cause a deterioration of its performance, the charging control unit 153 changes the priority of the battery pack 4 to "1" and that of the battery pack 3 to "2". Then, after waiting until the temperature of the battery pack 3 enters the range between the first and second preset values, the charging control unit 153 charges the battery pack 3. In this case, it is preferable that the second preset value is set to about 60° C., and the first preset value about 0° C.

As described above, in accordance with the battery charger of the present invention, each of the battery packs 3 and 4 connected to the attachment portion 20 is charged for a specified period of time, and the rate of temperature changes in each of them are calculated. Then, after the remaining capacity of each of the battery packs 3 and 4 is calculated from the calculated rate of temperature change, the priorities are assigned to the battery pack 3 and 4 such that the one whose remaining capacity has been detected to be closer to the fully charged state is given a higher priority. Then, each of the battery packs 3 and 4 is charged according to the assigned priority.

In other words, the temperature of the battery pack 40 is measured when it is charged for a specified period of time and the state thereof is stabilized, and the remaining capacity of the battery pack 40 is determined based on thus measured temperature. Therefore, the remaining capacity of the battery pack 40 can be detected exactly. Further, since the priority is assigned to the battery pack in decreasing order of closeness to the fully charged state based on the remaining capacity detected as above, the reliability of priority is enhanced, and the user can obtain a fully charged battery pack more promptly.

In the above description, the pack type detection unit 19 is configured to detect whether the battery pack 40 is of the first or the second pack type. However, its configuration is not limited thereto, and may be configured to detect between three or more pack types. In this case, it is preferable that a plurality of terminals T16 ia provided in each of the attachment parts 21 and 22, and a bit pattern predefined for indicating the pack type of the battery pack 40 may be input from the battery pack 40, wherein a ground voltage is predefined as "0" and an open voltage is predefined as "1".

In this configuration, the pack type detection unit 19 may determine the pack type of the battery pack 40 connected to the attachment parts 21 or 22 on the basis of the bit pattern input to the terminals T16. Further, in this case, the table storage unit 152 may store therein tables predefined according to the pack type of the battery pack 40 supposed to be connected to the attachment portion 20. Further, the remaining capacity detection unit 151 may elect a table corresponding to the pack type determined by the pack type detection unit 19 from the tables stored in the table storage unit 152, and may detect the remaining capacity of the battery pack 40 connected to the attachment parts 21 or 22 by referring to the elected table.

Further, although the attachment portion 20 includes two attachment parts 21 and 22 in the above description, it is not limited to such configuration. That is, the attachment portion 20 may include three or more attachment parts. In this case, it is preferable that the charging control unit 153 assigns the priority to the battery packs according to the number of the battery packs connected to the attachment portion 20.

Further, although the battery packs 3 and 4 are of different pack types in the above description, they may be of the same pack type. In this case, the remaining capacity detection unit 151 may detect the remaining capacities of the battery packs 3 and 4 by referring to the same table.

In the battery charger 1 described above, the table storage unit 152 stores the tables predefined according to the pack type. However, its configuration is not limited thereto, and the table storage unit 152 may store the tables predefined according to the temperature (e.g., a low temperature, a normal temperature and a high temperature) of the battery pack 40. In this case, it is preferable that the temperature of the battery pack 40 is detected by the temperature detection unit 18, and the remaining capacity detection unit 151 elects a table corresponding to the detected temperature (e.g., a low temperature, a normal temperature and a high temperature) from the stored tables to thereby detect the remaining capacity of the battery pack 40. Further, the table storage unit 152 may store different tables corresponding to different temperatures for the same battery pack.

Further, there may be some cases where the capacity required for fully charging the battery pack 3 is less than the capacity required for fully charging the battery pack 4 even when the remaining capacity of the battery pack 3 is smaller than that of the battery pack 4. For example, if the rated capacities of the battery packs 3 and 4 are respectively 1200 mAh and 2000 mAh, respectively, and the remaining capacities of the battery packs 3 and 4 are respectively 50% and 60%, 600 mAh of more capacity would be required to complete the charge of the battery pack 3 whereas 800 mAh of more capacity would be required to complete the charge of the battery pack 4. In such cases, the charging control unit 153 may assign a higher priority to the battery pack 3 than the battery pack 4.

Further, even when the battery pack 3 is closer to the fully charged state than the battery pack 4, if the battery pack 3 is in an abnormal state and the thermo switch SW1 is turned off, the charging control unit 153 may assign a higher priority to the battery pack 4 than the battery pack 3. In this manner, the user can obtain a fully charged battery pack 40 more promptly.

Embodiment 2

Hereinafter, a battery charger 1*a* in accordance with a second embodiment of the present invention will be described. In the battery charger 1*a* in accordance with the second embodiment, the remaining capacity of a battery pack 40 is detected on the basis of voltage. Since the configuration of the battery charger 1*a* is similar to that of the battery charger 1 of the first embodiment, the following descriptions will be made with reference to FIG. 1. Further, in the present embodiment, components that are not particularly described here are deemed to be the same as those of the first embodiment.

A remaining capacity detection unit 151 specifies the remaining capacities of respective battery packs 3 and 4 connected to an attachment portion 20 based on the voltages of the battery packs 3 and 4 after charging each of the battery packs 3 and 4 for a specified period of time.

More specifically, the remaining capacity detection unit 151 specifies a tables for each of the battery packs 3 and 4 by electing one from tables stored in the table storage unit 152 according to a pack type of the battery pack determined by the pack type detection unit 19, wherein the tables are predefined according to the pack type. Further, the remaining capacity detection unit 151 charges each of the battery packs 3 and 4 for a specified period of time, and calculates a rate of voltage change and an average voltage for each of the battery packs 3 and 4, from a plurality of voltage values detected by the voltage detection unit 12 during a short time period immediately after the specified period of time has elapsed, and outputs the rate of voltage change and the average voltage as a rate of voltage and a voltage after the charging. Further, the remaining capacity detection unit 151 detects the remaining capacity corresponding to the calculated rate of voltage change and voltage by referring to the elected table, thereby detecting the remaining capacities of the battery packs 3 and 4.

The table storage unit 152 stores a plurality of tables predefined according to the pack type. Each of the tables indicates the relationship between the rate of voltage change and the remaining capacity for each battery pack during the charging.

FIG. 4 is a graph showing the rate of voltage change ($\Delta V/\Delta t$) depending on the charging time of the battery pack in case of constant current charging, wherein the vertical axis indicates the rate of voltage change and the horizontal axis indicates the charging time. As shown therein, it can be understood that the rate of voltage change decreases until the charging time reaches 20%, gradually decreases during the charging time from 20% to 70%, steeply increases during the charging time from 80% to 90%, and steeply decreases after the charging time exceeds 90%.

FIG. 5 shows an exemplary table stored in the table storage unit 152. This table, which shows the relationship between the voltage, the rate of temperature change and the remaining capacity, is created based on the experimental results of FIG. 2A and FIG. 4 that were obtained by actually charging the battery pack 40 at a constant current. Further, the table storage unit 152 stores therein the table of FIG. 5 prepared in advance for each pack type.

Referring to this table, the remaining capacity detection unit 151 determines that the remaining capacity of the battery pack 40 is equal to or less than 20%, if the voltage measured immediately after the battery pack 40 is charged for a specified period of time is greater than 0 and equal to or less than A, and the rate of voltage change is greater than a and equal to or less than b; determines that the remaining capacity is greater than 20% and equal to or less than 50%, if the voltage is greater than 0 and equal to or less than A and the rate of voltage change is greater than 0, and equal to or less than a; determines that the remaining capacity is greater than 50% and equal to or less than 80%, if the voltage is greater than A and is equal to or less than B, and the rate of voltage change is greater than 0 and equal to or less than a; determines that the remaining capacity is greater than 80% and equal to or less than 90%, if the voltage is greater than B and equal to or less than C, and the rate of voltage change is greater than a and equal to or less than b; and determines that the remaining capacity is greater than 90%, if the voltage is greater than C, and the rate of voltage change is greater than 0 and equal to or less than b.

Further, the charging operation of the battery charger 1*a* is the same as that of the battery charger 1 except for the operation for detecting the remaining capacity. Therefore, detailed descriptions of these common features will be omitted.

As described above, in accordance with the battery charger 1*a* of the second embodiment, the remaining capacity is detected based on both of the voltage and the rate of voltage change. Thus, the remaining capacity of the battery pack 40 can be calculated more accurately.

Further, in the battery charger 1*a*, the remaining capacity detection unit 151 detects the remaining capacity based on both of the voltage and the rate of voltage change, but is not limited thereto. The battery charger 1*a* may detect the remaining capacity of the battery pack 40 using only the voltage detected immediately after charging the battery pack for the specified period of time. In this case, the remaining capacity detection unit 151 may specify the remaining capacity by referring only to the voltage and the remaining capacity in the table of FIG. 5.

Embodiment 3

Hereinafter, a battery charger 1b in accordance with a third embodiment of the present invention will be described. In the battery charger 1b, the remaining capacity of a battery pack 40 is detected on the basis of the voltage and the current. Since the configuration of the battery charger 1b of the third embodiment is similar to that of the battery charger 1 of the first embodiment, the following descriptions will be made with reference to FIG. 1. In the third embodiment, components that are not specially described here should be regarded as the same as those of the first embodiment.

A remaining capacity detection unit 151 specifies the remaining capacities of battery packs 3 and 4 connected to an attachment portion 20 based on the voltages and current of the battery packs 3 and 4 measured after charging each of the battery packs 3 and 4 for a specified period of time.

More specifically, the remaining capacity detection unit 151 specifies a tables for each of the battery packs 3 and 4 by electing one from tables stored in a table storage unit 152 according to the pack type of the battery pack determined by a pack type detection unit 19, wherein the tables are predefined according to the pack type. Further, the remaining capacity detection unit 151 detects the remaining capacities of each of the battery packs 3 and 4 based on the voltage and the current measured immediately after charging each of the battery packs for a specified period of time by referring to the elected table.

The table storage unit 152 stores a plurality of tables predefined according to the pack type. In this case, the table indicates the relationship between the voltage, the current and the remaining capacity of the battery pack 40 at the time of charging.

Figures 6, 7:
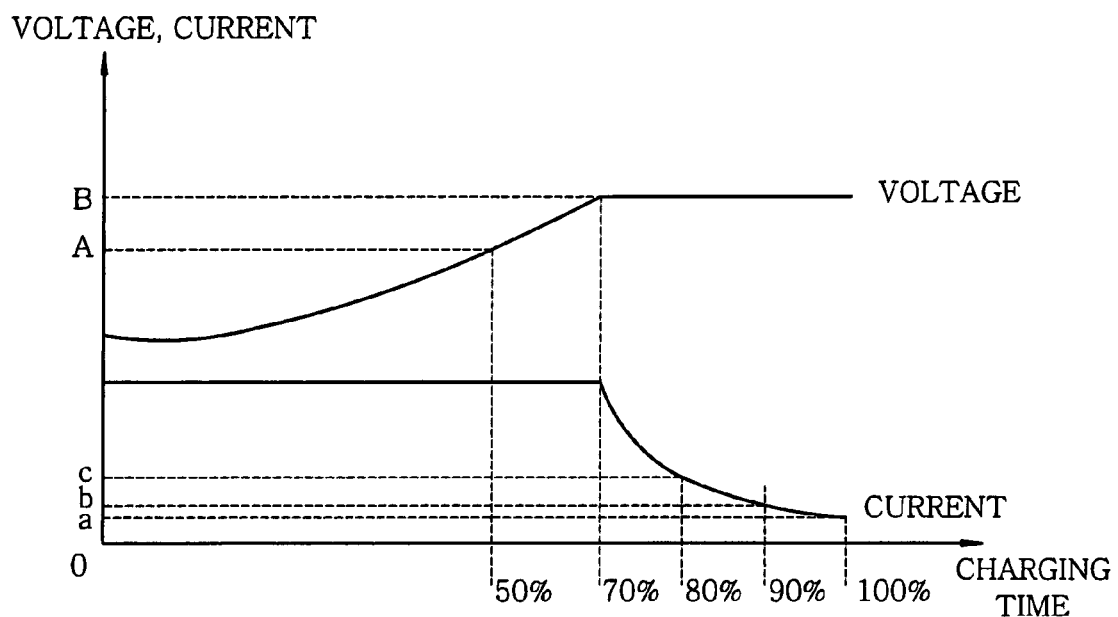
FIG. 6 is a graph showing a voltage and a current depending on a charging time in case of charging a battery pack initially at a constant current and then at a constant voltage.
FIG. 7 is a table showing the relationship between a voltage, a current and a remaining capacity.

FIG. 6 is a graph showing the voltage and the current depending on the charging time in case of charging the battery pack 40 initially at a constant current and then at a constant voltage such that the battery pack 40 is charged at the constant current until the voltage reaches a specified value B and then at the constant voltage after the voltage exceeds the value B, and the charging is terminated when the current reaches a specified value a. In FIG. 6, the vertical axis indicates the voltage and the current, and the horizontal axis indicates the charging time. Further, the upper curve denotes the voltage, and the lower curve denotes the current. As shown therein, until the charging time reaches 70%, the constant current charging is performed such that the current is maintained at a constant value whereas the voltage increases at a nearly constant rate. However, after the charging time exceeds 70%, the constant voltage charging is performed such that voltage is maintained at a constant value whereas the current decreases in a downwardly convex curve.

FIG. 7 shows an exemplary table stored in the table storage unit 152. This table, which shows the relationships between the voltage, the current and the remaining capacity, is created based on the experimental results of FIG. 6 by actually charging the battery pack 40 according to the constant-current constant-voltage charging (i.e., charging initially at the constant current and then at the constant voltage). Further, the table storage unit 152 stores the table of FIG. 7 previously created for each pack type.

Referring to this table, the remaining capacity detection unit 151 determines that the remaining capacity of the battery pack 40 is equal to or less than 50%, if the voltage after charging the battery pack 40 for a specified period of time is equal to or less than A, and the current is greater than C; determines that the remaining capacity is greater than 50% and equal to or less than 70%, if the voltage is greater than A and equal to or less than B, and the current is greater than C; determines that the remaining capacity is greater than 80% and equal to or less than 90%, if the voltage is greater than B, and the current is greater than b and equal to or less than c; and determines that the remaining capacity is greater than 90% and equal to or less than 100%, if the voltage is greater than B, and the current is greater than a and equal to or less than b.

In case of charging the battery pack 40 whose pack type determined by the pack type detection unit 19 requires the constant-current constant-voltage charging, a charging control unit 153 performs a constant current charging until the voltage of the battery pack 40 reaches a specified value, and then performs a constant voltage charging after the voltage exceeds the specified value.

Hereinafter, the charging operation of the battery charger 1b will be described. Here, each of the battery packs 3 and 4 is assumed to be a lithium-ion secondary battery or a lead acid battery charged according to the constant-current constant-voltage charging.

First, after the battery pack 4 is connected to an attachment part 22 concurrently with the battery pack 3 being connected to an attachment part 21, the pack type detection unit 19 determines that the battery pack of a first pack type is connected to the attachment part 21, and that of a second pack type is connected to the attachment part 22 in a manner similar to that of the battery charger 1.

Next, the remaining capacity detection unit 151 connects the battery pack 3 to a charging path C1 by controlling a relay 13, and then charges the battery pack 3 for a specified period of time (e.g., 30 seconds to 1 minute). Then, the remaining capacity detection unit 151 has the current detection unit 14 detect the current of the battery pack 3 immediately after the specified period of time has elapsed from the start of the charging, and has the voltage detection unit 12 detect the voltage of the battery pack 3 immediately after the specified period of time has elapsed from the start of the charging. Thereafter, the remaining capacity detection unit 151 terminates the charging.

Next, the remaining capacity detection unit 151 elects a table corresponding to the first pack type from the tables stored in the table storage unit 152 to thereby specify the remaining capacity based on the detected current and voltage by referring to the specified table.

Thereafter, the remaining capacity detection unit 151 connects the battery pack 4 to the charging path C1 by controlling the relay 13, thus charging the battery pack 4 for a specified period of time (30 seconds~1 minute). Then, the remaining capacity detection unit 151 detects the remaining capacity of the battery pack 4 by using the same method as the battery pack 3.

Thereafter, the charging control unit 153 charges the battery packs 3 and 4 sequentially such that the one closer to a fully charged state is charged first, in a manner same as the battery charger 1 except that the battery charger 1b performs the constant-current constant-voltage charging. If the pack type and the temperatures of the battery pack 40 connected to the attachment part 21 is the same as those of the battery pack 40 connected to the attachment part 22, the charging control unit 153 may determine that, during the constant current charging, the battery pack having a higher voltage is closer to the fully charged state, and, during the constant voltage charging, the battery pack having a lower current is closer to the fully charged state.

As described above, in the battery charger 1b in accordance with the third embodiment, the remaining capacity is detected based on the current and the voltage by referring to the table describing the relationships between the current, the voltage and the remaining capacity of the battery pack 40 in case of the constant-current constant-voltage charging. Thus, the remaining capacity of the battery pack 40 that is charged initially at a constant current and then the current and the voltage constant voltage can be detected with a higher precision.

Embodiment 4

Hereinafter, a battery charger 1c in accordance with a fourth embodiment of the present invention will be described. The battery charger 1c of the fourth embodiment differs from the battery chargers 1, 1a and 1b of the first to third embodiments in that a microcomputer 15', instead of a pack type detection unit 19, determines the pack type of a battery pack 40.

Figure 8:
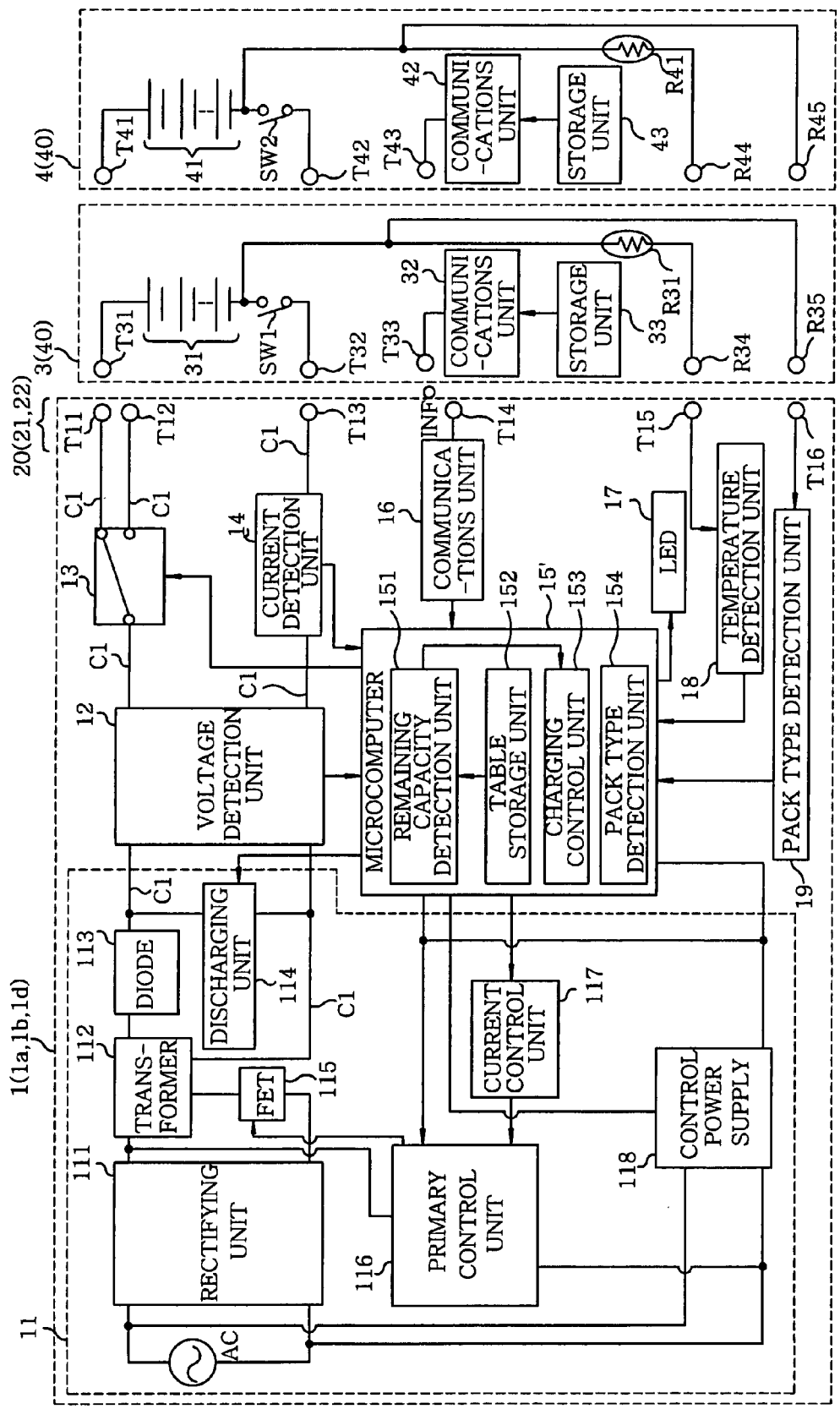
FIG. 8 is a block diagram showing the overall configuration of a battery charger in accordance with a fourth embodiment of the present invention.

FIG. 8 is a block diagram showing the overall configuration of the battery charger 1c in accordance with the fourth embodiment. The microcomputer 15' further includes a pack type detection unit 154 than the microcomputer 15 of the first to third embodiments. The pack type detection unit 154 (battery type detection unit) receives pack type data from the battery packs 40 connected to an attachment part 21 or 22 via a terminal T14 and a communications unit 16, and determines the pack type of the battery pack 40 on the basis of the received pack type data.

FIG. 9 is a diagram showing an exemplary data format of the pack type data transmitted from the battery pack 40. As shown therein, the pack type data is configured as 16-bit data, in which data indicating a type of the battery pack 40 is stored in two bits (from the 1st to 2nd bits); data indicating the number of cells in the battery pack 40 is stored in four bits (from the 3rd to 7th bits); data indicating the present remaining capacity of the battery pack 40 is stored in four bits (from the 8th to 11th bits); and data indicating the rated capacity of the battery pack 40 is stored in five bits (from the 12th to 16th bits).

Herein, in the data indicating the type of battery pack 40, "00" indicates a lead acid battery, "01" indicates a nickel-cadmium battery, "10" indicates a nickel-manganese battery, and "11" indicates a lithium-ion battery. Further, the data indicating the number of cells represents the number of cells in the battery pack 40 as a binary number. Further, the data indicating the remaining capacity represents a remaining capacity (%) as a binary number. Finally, the data indicating the rated capacity represents the rated capacity (mAh) as a binary number.

When the battery pack 40 is connected to the attachment portion 20, a communications unit 32 reads the pack type data from a storage unit 33, and transmits the pack type data to the battery charger 1c via a terminal T33. Meanwhile, the communications unit 16 receives the pack type data from the battery pack 40. The pack type detection unit 154 determines the pack type of the battery pack 40 connected to the attachment part 21 or 22 on the basis of the pack type data received via the communications unit 16.

As described above, in the battery charger 1c in accordance with the fourth embodiment, the pack type is determined based on the pack type data transmitted from the battery pack 40. Therefore, the pack type can be determined by using only a terminal T14 for transmitting or receiving data to or from the battery pack 40, thereby making it possible to reduce the number of terminals in the attachment portion.

Further, it is also possible the pack type data includes that data indicating "required capacity for reaching a fully charged state" so that the charging control unit 153 assigns priorities on the basis of this data.

Embodiment 5

Hereinafter, a battery charger 1d in accordance with a fifth embodiment of the present invention will be described. In the battery charger 1d of the fifth embodiment, the remaining capacity of a battery pack 40 is detected on the basis of the voltage thereof measured after discharging the battery pack 40 for a specified period of time. Since the configuration of the battery charger 1d of the fifth embodiment is similar to that of the battery chargers 1, 1a and 1b of the first to third embodiments, the following descriptions will be made with reference to FIG. 1. In the fifth embodiment, components that are not specially described should be regarded to be the same as those of the first to third embodiments.

A remaining capacity detection unit 151 specifies the remaining capacity of each of battery packs 3 and 4 connected to an attachment portion 20 on the basis of the voltage of each of the battery packs 3 and 4 measured after discharging each of the battery packs for a specified period of time (for example, 10 seconds).

More specifically, the remaining capacity detection unit 151 elects a table from tables stored in a table storage unit 152 based on a pack type, wherein the tables are predefined according to the pack type of each of the battery packs 3 and 4 determined by a pack type detection unit 19. Further, the remaining capacity detection unit 151 makes the battery packs 3 and 4 discharged for a specified period of time, calculates the rate of voltage change and the average voltage of each of the battery packs 3 and 4 from a plurality of voltages measured by the voltage detection unit 12 during a short time period immediately after the specified period of time has elapsed, and lets the calculated rate of voltage change and average voltage as a rate of voltage and a voltage after the discharging. Further, the remaining capacity detection unit 151 specifies the remaining capacity based on the rate of voltage change and the voltage by referring to the elected table, thereby detecting the remaining capacities of the battery packs 3 and 4. Further, the remaining capacity detection unit 151 has a current flow from the battery pack 40 to a discharging unit 114 by turning on a switch arranged in the discharging unit 114, thereby discharging the battery pack 40 for the specified period of time.

The table storage unit 152 stores therein a plurality of tables predefined according to the pack type. Herein, each of the tables indicates the relationship between the rate of voltage change and the remaining capacity of the battery pack 40 at the time of discharging.

FIG. 10A is a graph showing the voltage depending on the discharging time of the battery pack 40 in case of a constant current discharging, wherein the vertical axis indicates the voltage and the horizontal axis indicates the discharging time. The discharging time refers to the ratio of the present charging time to the total charging time required for discharging a fully charged battery pack 40 to an empty state. Herein, the total discharging time is defined as 100%.

As shown therein, the voltage decreases in a downwardly convex curve until the discharging time reaches 50%, gradually decreases while the discharging time changes from 50% to 80%, and steeply decreases after the discharging time exceeds 80%.

FIG. 10B is a graph showing the rate of voltage change depending on the discharging time of the battery pack 40 in case of the constant current discharging, wherein the vertical axis indicates the rate of voltage change and the horizontal axis indicates the discharging time. As shown therein, the rate of voltage change is maintained at a nearly constant value until the discharging time reaches 80%, and steeply increases after the discharging time exceeds 80%.

FIG. 11 shows an exemplary table stored in the table storage unit 152. This table, which shows the voltage, the rate of voltage change, and the remaining capacity, is created based on the experimental results of FIGS. 10A and 10B by actually discharging the battery pack 40 at a constant current. Further, the table storage unit 152 stores the table of FIG. 11 previously created for each pack.

Further, referring to the table of FIG. 11, the remaining capacity detection unit 151 determines that the remaining capacity of the battery pack 40 is equal to or less than 50%, if the voltage measured after the specified period of time has elapsed from the start of the discharging is greater than C, and the rate of voltage change is greater than 0 and equal to or less than a; determines that the remaining capacity is greater than 50% and equal to or less than 80%, if the voltage is greater than B and equal to or less than C, and the rate of voltage change is greater than 0 and equal to or less than a; determines that the remaining capacity is greater than 80% and equal to or less than 90%, if the voltage is greater than A and equal to or less than B, and the rate of voltage change is greater than a and equal to or less than b; and determines that the remaining capacity is greater than 90% and equal to or less than 100%, if the voltage is greater than 0 and equal to or less than A, and the rate of voltage change is greater than b.

Further, the charging operation of the battery charger 1d is the same as that of the battery charger 1a except for the operation for detecting the remaining capacity. Therefore, detailed descriptions of these common features will be omitted.

As described above, in the battery charger 1d in accordance with the fifth embodiment, the remaining capacity of the battery pack is detected on the basis of the voltage measured when the battery pack 40 is discharged for a specified period of time. Thus, the remaining capacity of the battery pack 40 can be calculated with a higher precision.

Moreover, in the fifth embodiment, it is also possible that a pack type detection unit 154 is included in the microcomputer 15 in a manner similar to the fourth embodiment so that the pack type may be determined based on the pack type data transmitted from the battery pack 40.

While the invention has been shown and described with respect to the embodiment, it will be understood by those skilled in the art that various changes and modification can be made without departing from the scope of the invention as defined in the following claims.

What is claimed is:

1. A battery charger, comprising:
an attachment portion capable of being connected to a plurality of battery packs;
a connection unit for connecting one of the battery packs connected to the attachment portion to a charging path;
a state detection unit for detecting a state of each of the battery packs;
a remaining capacity detection unit for detecting a remaining capacity of each of the battery packs connected to the attachment portion based on the state of the battery pack detected by the state detection unit after each of the battery pack is charged for a specified period of time;
a charging control unit for assigning priorities to the battery packs such that one of the battery packs whose remaining capacity detected by the remaining capacity detection unit is closer to a fully charged state thereof has a higher priority, and controlling the connection unit to charge the battery packs according to the assigned priorities;
a battery type detection unit for determining a pack type specified by at least one of a type of each of the battery packs connected to the attachment portion, the number of cells in said each of the battery packs, and a rated capacity of said each of the battery packs; and
a table storage unit for storing therein tables predefined according to the pack type to indicate a relationship between the state of each of the battery packs and the remaining capacity,
wherein the remaining capacity detection unit elects a table from the tables stored in the table storage unit based on the pack type determined by the battery type detection unit, and detects the remaining capacity of each of the battery packs by referring to the elected table,
wherein the state detection unit detects a voltage of each of the battery packs and a current flowing through the charging path as the state of the battery pack, and, if the pack type determined by the battery type detection unit is a specific type, the charging control unit charges the battery pack at a constant current until the voltage of the battery pack reaches a specified value, and then at a constant voltage after the voltage of the battery pack exceeds the specified value, and
wherein the table indicates relationships between the voltage, the current and the remaining capacity in case of charging the battery pack of the specific type initially at the constant current and then at the constant voltage, and the remaining capacity detection unit specifies the remaining capacity based on the voltage and the current detected by the state detection unit by referring to the table.

2. The battery charger of claim 1, wherein the state detection unit detects a temperature of each of the battery packs as the state of the battery pack, the table indicates a relationship between a rate of temperature change in each of the battery packs and the remaining capacity during a charging, and the remaining capacity detection unit calculates the rate of temperature change based on the temperature detected by the state detection unit to thereby specify the remaining capacity based on the calculated rate of temperature change by referring to the table.

3. The battery charger of claim 1, wherein the state detection unit detects a voltage of each of the battery packs as the state of the battery pack, the table indicates a relationship between a voltage or a rate of voltage change in each of the battery packs and the remaining capacity of each of the battery pack during a charging, and the remaining capacity detection unit specifies the remaining capacity based on the voltage detected by the state detection unit or the rate of voltage change obtained from the voltage by referring to the table.

4. A battery charger, comprising:
an attachment portion capable of being connected to a plurality of battery packs;
a connection unit for connecting one of the battery packs connected to the attachment portion to a charging path;
a state detection unit for detecting a state of each of the battery packs;
a remaining capacity detection unit for detecting a remaining capacity of each of the battery packs connected to the attachment portion based on the state of the battery pack detected by the state detection unit after each of the battery pack is discharged for a specified period of time;

a charging control unit for assigning priorities to the battery packs such that one of the battery packs whose remaining capacity detected by the remaining capacity detection unit is closer to a fully charged state thereof has a higher priority, and controlling the connection unit to charge the battery packs according to the assigned priorities;

a battery type detection unit for determining a pack type specified by at least one of a type of each of the battery packs connected to the attachment portion, the number of cells in said each of the battery packs, and a rated capacity of said each of the battery packs; and a table storage unit for storing therein tables predefined according to the pack type to indicate a relationship between the state of each of the battery packs and the remaining capacity, wherein the remaining capacity detection unit elects a table from the tables stored in the table storage unit based on the pack type determined by the battery type detection unit, and detects the remaining capacity of each of the battery packs by referring to the elected table, wherein the state detection unit detects a voltage of each of the battery packs and a current flowing through the charging path as the state of the battery pack, and, if the pack type determined by the battery type detection unit is a specific type, the charging control unit charges the battery pack at a constant current until the voltage of the battery pack reaches a specified value, and then at a constant voltage after the voltage of the battery pack exceeds the specified value, and wherein the table indicates relationships between the voltage, the current and the remaining capacity in case of charging the battery pack of the specific type initially at the constant current and then at the constant voltage, and the remaining capacity detection unit specifies the remaining capacity based on the voltage and the current detected by the state detection unit by referring to the table.

5. The battery charger of claim 4, wherein the state detection unit detects a voltage of each of the battery packs as the state of the battery pack, the table indicates a relationship between a voltage or a rate of voltage change in each of the battery packs and the remaining capacity of each of the battery pack during a discharging, and the remaining capacity detection unit specifies the remaining capacity based on the voltage detected by the state detection unit or the rate of voltage change obtained from the voltage by referring to the table.

6. The battery charger of claim 1, further comprising:
a communications unit for receiving pack type data from the battery pack, the pack type data indicating a pack type of each of the battery packs specified by at least one of a type of each of the battery packs connected to the attachment portion, the number of cells in said each of the battery pack, and a rated capacity of said each of the battery pack, wherein the battery type detection unit determines the pack type of each of the battery packs based on the pack type data received via the communications unit.

7. The battery charger of claim 1, wherein, if the remaining capacity detection unit determines that every one of the battery packs connected to the attachment portion are in an empty state, the charging control unit detects a rated capacity of each of the battery packs, and charges the battery packs such that one having a lower rated capacity is charged first.

8. The battery charger of claim 1, wherein the state detection unit detects a temperature of each of the battery packs, and, if there is a battery pack whose temperature detected by the state detection unit is higher than a first preset value or lower than a second preset value lower than the first preset value, the charging control unit suspends a charging of the battery pack, and first charges other battery pack whose temperature detected by the state detection unit falls within a range between the first and the second preset value.

9. A battery charger, comprising:
an attachment portion capable of being connected to a plurality of battery packs;
a connection unit for connecting one of the battery packs connected to the attachment portion to a charging path;
a state detection unit for detecting a state of each of the battery packs;
a remaining capacity detection unit for detecting a remaining capacity of each of the battery packs connected to the attachment portion based on the state of the battery pack detected by the state detection unit after each of the battery pack is charged for a specified period of time; and
a charging control unit for assigning priorities to the battery packs such that one of the battery packs whose remaining capacity detected by the remaining capacity detection unit is closer to a fully charged state thereof has a higher priority, and controlling the connection unit to charge the battery packs according to the assigned priorities,
wherein, if the remaining capacity detection unit determines that every one of the battery packs connected to the attachment portion are in an empty state, the charging control unit detects a rated capacity of each of the battery packs, and charges the battery packs such that one having a lower rated capacity is charged first.

10. A battery charger, comprising:
an attachment portion capable of being connected to a plurality of battery packs;
a connection unit for connecting one of the battery packs connected to the attachment portion to a charging path;
a state detection unit for detecting a state of each of the battery packs;
a remaining capacity detection unit for detecting a remaining capacity of each of the battery packs connected to the attachment portion based on the state of the battery pack detected by the state detection unit after each of the battery pack is discharged for a specified period of time; and
a charging control unit for assigning priorities to the battery packs such that one of the battery packs whose remaining capacity detected by the remaining capacity detection unit is closer to a fully charged state thereof has a higher priority, and controlling the connection unit to charge the battery packs according to the assigned priorities,
wherein, if the remaining capacity detection unit determines that every one of the battery packs connected to the attachment portion are in an empty state, the charging control unit detects a rated capacity of each of the battery packs, and charges the battery packs such that one having a lower rated capacity is charged first.

* * * * *